(12) United States Patent
Couch et al.

(10) Patent No.: US 10,784,641 B2
(45) Date of Patent: Sep. 22, 2020

(54) CRIMPING TOOL WITH WIRELESS COMMUNICATION SYSTEM

(71) Applicant: ABB Schweiz AG, Baden (CH)

(72) Inventors: Casey Couch, Jackson, TN (US); Paul Bartholomew, Somerville, TN (US); Ian Rubin de-la-Borbolla, Memphis, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/264,130

(22) Filed: Jan. 31, 2019

(65) Prior Publication Data
US 2019/0237926 A1 Aug. 1, 2019

Related U.S. Application Data

(60) Provisional application No. 62/624,194, filed on Jan. 31, 2018.

(51) Int. Cl.
| | |
|---|---|
| *H01R 43/042* | (2006.01) |
| *H01R 43/048* | (2006.01) |
| *H01R 4/20* | (2006.01) |
| *G06K 19/07* | (2006.01) |
| *H01R 4/18* | (2006.01) |

(52) U.S. Cl.
CPC ....... *H01R 43/048* (2013.01); *G06K 19/0723* (2013.01); *H01R 4/183* (2013.01); *H01R 4/20* (2013.01); *H01R 43/0428* (2013.01); *Y10T 29/53235* (2015.01)

(58) Field of Classification Search
CPC ............ H01R 43/0428; H01R 43/0585; H01R 43/045; H01R 43/048; Y10T 408/65; Y10T 29/53065; Y10T 29/49169; Y10T 29/53235

USPC .... 29/753, 407.08, 705, 709, 715, 720, 748, 29/751, 857, 861, 863
See application file for complete search history.

(56) References Cited

U.S. PATENT DOCUMENTS

| | | |
|---|---|---|
| 4,856,186 A | 8/1989 | Yeomans |
| 4,916,810 A | 4/1990 | Yeomans |
| 5,092,026 A | 3/1992 | Klemmer et al. |
| 5,101,651 A | 4/1992 | Yeomans |
| 5,123,165 A | 6/1992 | Strong et al. |

(Continued)

OTHER PUBLICATIONS

International Search Report and Written Opinion issued in corresponding international application No. PCT/US2019/016115, dated Apr. 24, 2019, 8 pp.

*Primary Examiner* — Thiem D Phan
(74) *Attorney, Agent, or Firm* — Taft Stettinius & Hollister LLP; J. Bruce Schelkopf

(57) ABSTRACT

A crimping tool, configured to crimp an electrical connector onto a conductor, includes a crimping body having an interior volume, a crimping head connected to the crimping body, a user interface installed on the crimping body, an identification tag reader provided in the crimping tool, a wireless module installed within the interior volume of the crimping body, and a microcontroller installed within the interior volume of the crimping body. The wireless module transmits/receives crimp connection data to/from a remote computing device, which is capable of communicating with one or more databases in a server. The microcontroller is configured to communicate with the identification tag reader and the wireless module.

21 Claims, 5 Drawing Sheets

(56) References Cited

U.S. PATENT DOCUMENTS

| | | |
|---|---|---|
| 5,168,736 A | 12/1992 | Enneper et al. |
| 5,193,379 A | 3/1993 | Ferraro |
| 5,195,042 A | 3/1993 | Ferraro et al. |
| 5,197,186 A | 3/1993 | Strong et al. |
| 5,271,254 A | 12/1993 | Gloe et al. |
| 5,491,994 A | 2/1996 | Baldyga |
| 5,661,887 A | 9/1997 | Byrne et al. |
| 5,727,409 A | 3/1998 | Inoue et al. |
| 5,841,119 A | 11/1998 | Rouyrre et al. |
| 5,887,469 A | 3/1999 | Maeda et al. |
| 5,901,440 A | 5/1999 | Maeda et al. |
| 5,937,505 A | 8/1999 | Strong et al. |
| 6,062,778 A | 5/2000 | Szuba et al. |
| 6,067,828 A | 5/2000 | Bucher et al. |
| 6,161,407 A | 12/2000 | Meisser |
| 6,418,769 B1 | 7/2002 | Schreiner |
| 6,606,891 B1 | 8/2003 | McGowen et al. |
| 6,843,628 B1 | 1/2005 | Hoffmeister et al. |
| 7,086,261 B2 | 8/2006 | Saito et al. |
| 7,174,324 B2 | 2/2007 | Kakuhari et al. |
| 7,181,942 B2 | 2/2007 | Yost et al. |
| 7,306,489 B2 | 12/2007 | Werthman et al. |
| 7,353,677 B2 | 4/2008 | Zusi |
| 7,418,851 B2 | 9/2008 | Labro |
| 7,490,498 B2 | 2/2009 | Zusi |
| 7,587,918 B2 | 9/2009 | Imgrut |
| 7,703,669 B2 | 4/2010 | Amirehteshami et al. |
| 8,468,231 B1 | 6/2013 | Vance |
| 8,519,558 B2 | 8/2013 | Leininger |
| 8,552,876 B2 | 10/2013 | King, Jr. |
| 8,570,536 B2 | 10/2013 | Kelly |
| 8,671,538 B2 | 3/2014 | Ayabakan et al. |
| 8,671,551 B2 | 3/2014 | Yost et al. |
| 9,871,335 B2 | 1/2018 | Deck |
| 10,226,826 B2 * | 3/2019 | Kehoe ............... B23D 29/00 |
| 10,312,653 B2 * | 6/2019 | Ballard ............ H01R 43/0427 |
| 2002/0036770 A1 | 3/2002 | Maeda |
| 2006/0019540 A1 | 1/2006 | Werthman et al. |
| 2012/0314226 A1 | 12/2012 | Kelly |
| 2013/0044333 A1 | 2/2013 | Onuma |
| 2016/0094000 A1 | 3/2016 | Deck |
| 2016/0363510 A1 | 12/2016 | Kanack et al. |

* cited by examiner

CRIMPING TOOL WITH WIRELESS COMMUNICATION SYSTEM

FIELD OF THE INVENTION

The present invention relates to crimping tools, and more particularly, to crimping tools configured to apply appropriate crimp parameters without the need for manual settings or adjustments, and provide crimp connection data that demonstrates compliance with predetermined parameters.

BACKGROUND

Crimp connections are widely used in industry to connect electrical conductors or wire cables together. Crimp connections are also used to fasten an electrical connector to the end of a single cable so that the cable or conductor can be attached to electrical components or systems. Often, the cable or conductor is inserted into the electrical connector, and the electrical connector is then compressed tightly around the cable or conductor with a crimping tool having a die set, or with a dieless crimping tool.

Traditionally, dieless crimping tools available in the market do not provide any status (or data) as to whether the crimping operation complies with regulatory requirements. Moreover, typically crimping tools using dies require operator intervention each time a different connector size is crimped as well as initial purchase and inventory management expense of dies. For example, the crimping tools typically require an operator to manually set and adjust the tool based on the particular gauge of the cable and the size of the connector to be crimped.

Accordingly, there is a need for a dieless crimping tool capable of applying appropriate crimp parameters without the need for manual settings, and which provides crimp connection data that demonstrates compliance with predetermined parameters.

SUMMARY

According to an embodiment of the present application, a crimping tool, configured to crimp an electrical connector onto a conductor, includes a crimping body having an interior volume, a crimping head connected to the crimping body, a user interface installed on the crimping body, an identification tag reader provided in the crimping tool, a wireless module installed within the interior volume of the crimping body, and a microcontroller installed within the interior volume of the crimping body. The wireless module transmits/receives crimp connection data from smart connectors to a remote computing device that is capable of communicating with one or more databases in a server or cloud platform designed to save, manage, and share crimped connection data. The microcontroller is configured to communicate with the identification tag reader and the wireless module.

These and other aspects of the present application will be better understood in view of the drawings and following detailed description.

DETAILED DESCRIPTION

Figure 1:
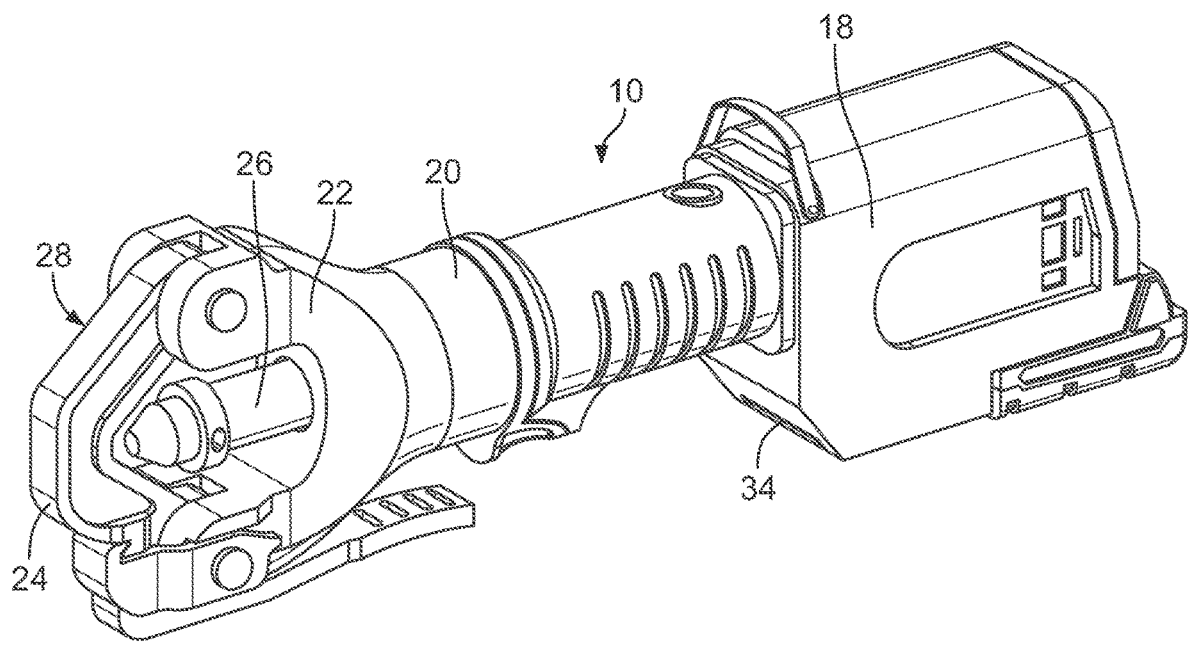
FIG. 1 is a perspective view of an exemplary crimping tool, according to an embodiment of the present application.

According to an embodiment of the present application, referring to FIGS. 1-6, there is shown a crimping tool 10 configured and adapted to compress an electrical connector 12 to the end of a conductor 14 so that the conductor 14 can be attached to an object or structure. The crimping tool 10 allows a user 16 of the tool 10 to easily and conveniently crimp the electrical connector 12 by applying an appropriate pressure and distance of movement of jaws 28 of the crimping tool 10, as will be described in greater detail below. After the crimping operation, the crimping tool 10 is capable of transmitting crimping connection data to demonstrate compliance via wireless communications to a database, as will be described in greater detail below.

Figure 2:
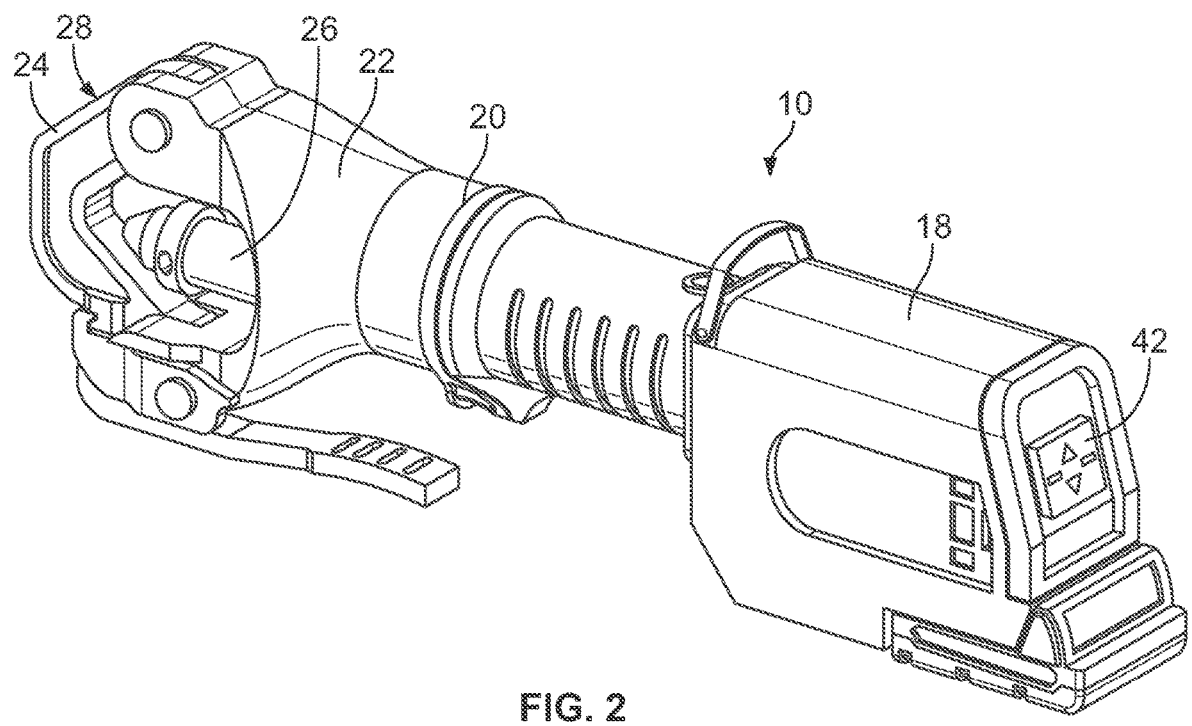
FIG. 2 is a rear perspective view of the crimping tool shown in FIG. 1.
Figure 3:
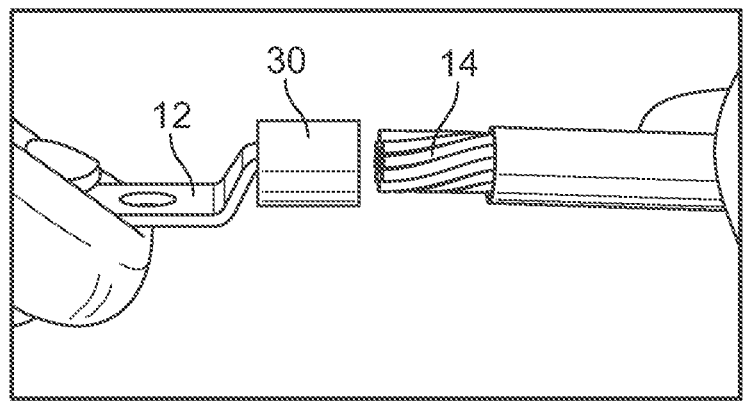
FIG. 3 is a perspective view of an exemplary electrical connector and an exemplary conductor.
Figure 4:
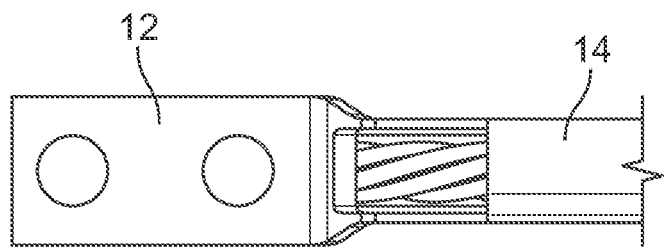
FIG. 4 is a top, partial cutaway view of the conductor shown in FIG. 3 inserted into the electrical connector that is shown in FIG. 3.
Figure 5A:
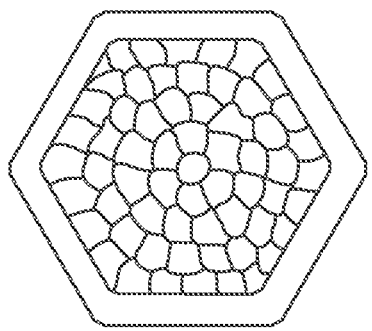
FIG. 5A is a cross sectional view of the electrical connector and the conductor in shown FIG. 4 after a crimping operation, resulting a hexagonal crimp shape.
Figure 5B:
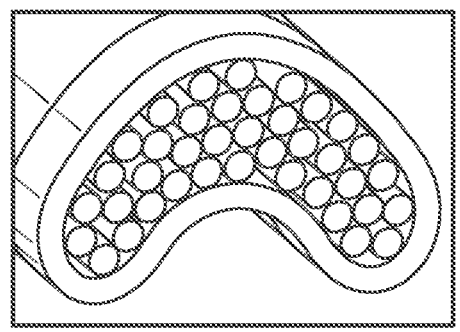
FIG. 5B is a cross sectional view of the electrical connector and the conductor in FIG. 4 after a crimping operation, resulting an indenter crimp shape.

Referring more particularly to FIGS. 1 and 2, the crimping tool 10 includes a crimping body 18 having an interior volume for containing various electrical, hydraulic, and electronic components therewithin and a crimping head 20 connected to the crimping body 18 for compressing the electrical connector 12. The crimping head 20 is generally comprised of a head frame 22, an anvil 24, and a movable indenter 26. The indenter 26 and the anvil 24 form jaws 28 of the crimping head 20 for compressing articles placed therebetween, such as electrical connectors and conductors, for crimp connection.

In the depicted embodiment, the crimping head 20 is constructed and designed to be dieless, which requires no crimping die sets. Also, the crimping head 20 is configured and dimensioned to crimp electrical connectors 12 of various sizes. In this depiction, the crimping head 20 is suitable for crimping the electrical connector 12 in the size range of approximately 4/0 to 750 kcmil for a copper electrical connector, and approximately 1/0 to 600 kcmil for an aluminum electrical connector, in a variety of configurations including, for example, but not limited to, standard barrel lugs, long barrel lugs, pin adapters, splices/reducers, etc.

The crimping tool 10 can be configured to operate with an electrical connector, which may or may not include an identification tag. In the depicted embodiment, referring to FIG. 3, the electrical connector 12 includes an identification tag 30, which contains electrical connector characteristics associated with the electrical connector 12. The identification tag 30 may be attached onto an outer surface of the electrical connector 12. Alternately, the identification tag 30 may be installed internally within the electrical connector 12 during a manufacturing operation.

According to certain embodiments, the identification tag 30 is a passive radio frequency identification (RFID) tag, in which power is supplied to the RFID tag by a tag reader. Alternatively, other identification tag systems, such as a quick response (QR) code or barcode, can be implemented to the electrical connector 12 for storing electrical connector characteristics.

Figure 6:
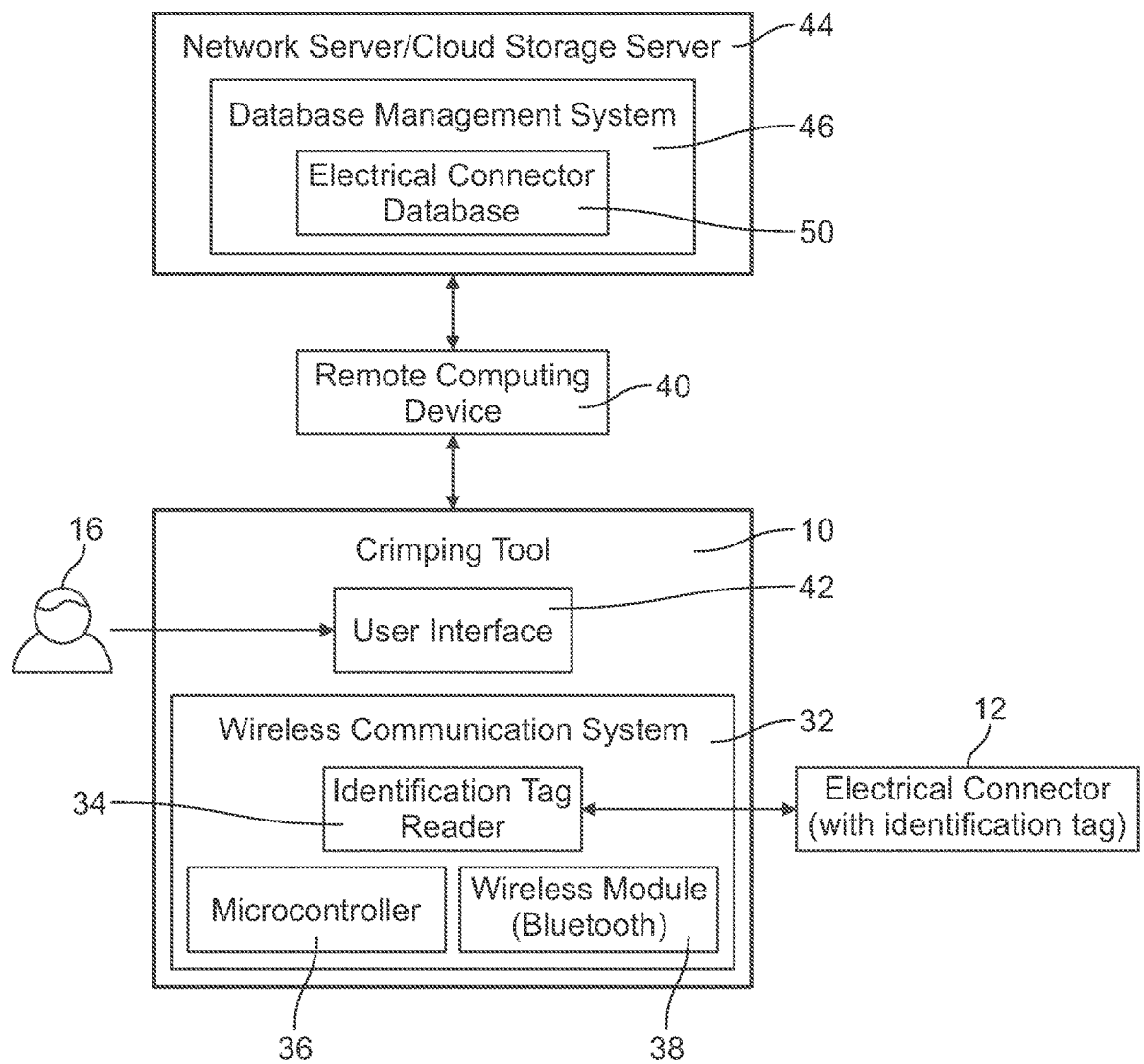
FIG. 6 is a block diagram illustrating wireless communications between the crimping tool in FIG. 1 and other devices.
Figure 7:
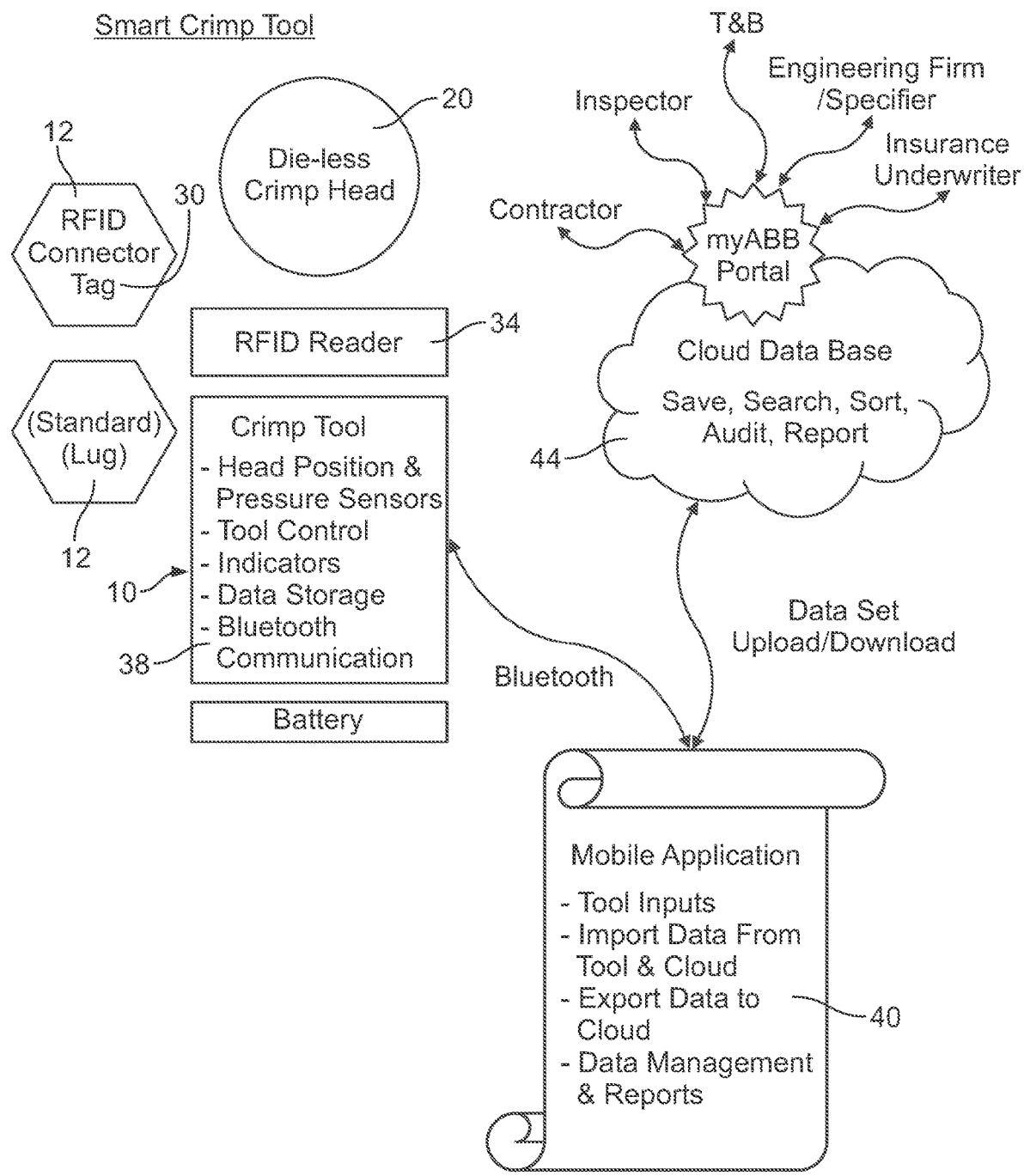
FIG. 7 is a system design diagram illustrating wireless communications between the crimping tool in FIG. 1 and other devices.

Referring to FIGS. 6 and 7, the crimping tool 10 further includes a wireless communication system 32 to facilitate wireless communications such as, for example, wirelessly exchanging data with other computing devices. According to the illustrated embodiment, the wireless communication system 32 includes an identification tag reader 34 for communicating with the identification tag 30 of the electrical connector 12, a microcontroller 36 installed within the interior volume of the crimping body 18, and a wireless module 38 also installed within the interior volume of the crimping body 18 for wirelessly transmitting/receiving data with other computing devices. Additionally, according to certain embodiments, the wireless communication system 32 can be electrically powered by the same system or source that is used to electrically power operation of other portions, if not all other electrically powered portions, of the crimping tool 10. For example, the wireless communication system 32 can be powered by at least a portion of the electrical power that is delivered, supplied, or otherwise provided to the crimping tool 10 in connection with the overall operation of the crimping tool 10, including, but not limited to, operation relating to the crimping of the electrical connector 12 by the crimping tool 10.

As shown in FIG. 1, the identification tag reader 34 is provided in the crimping tool 10. Thus, when the identification tag 30 of the electrical connector 12 is placed within the range of the identification tag reader 34, the reader 34 can scan/read the identification tag 30 via radio waves and gather the electrical connector characteristics associated with the electrical connector 12. The electrical connector characteristics may include, for example, a connector identification number, a connector type, and a connector size. The connector identification number is a unique number on the RFID tag that identifies the electrical connector 12. The connector type identifies the connector material, such as, e.g., aluminum or copper.

The microcontroller 36 contains one or more CPUs (central processing unit) along with memory and programmable input/output. Thus, once the electrical connector characteristics are gathered via the identification tag reader 34, the microcontroller 36 executes proper computer programs to retrieve a minimum required pressure and distance of movement of the jaws 28 suitable for crimping the electrical connector 12 from a lookup table stored in the memory.

As stated above, the crimping tool 10 can also operate with a conventional standard electrical connector (without an identification tag). To facilitate crimping operation of a standard electrical connector, a user interface 42 is provided for the user 16, as shown in FIG. 2, to manually input various information related to the electrical connector. For example, the user interface 42 allows the user 16 to manually input the electrical connector characteristics associated with the conventional standard electrical connector. Once the user 16 completes inputting of the electrical connector characteristics, similar to the electrical connector 12 with the identification tag 30, the microcontroller 36 executes proper computer programs to retrieve a minimum required pressure and distance of movement of the jaws 28 suitable for crimping the standard electrical connector from the lookup table stored in the memory.

At the completion of each crimping operation, the crimping tool 10 produces a crimp shape, e.g., an indenter or hexagonal crimp shape (shown, for example, in FIGS. 5A and 5B), and generates a crimp state (either a success indicated as a green light or a failure indicated as a red light), based upon the minimum required pressure and distance of movement of the jaws 28. In addition, the crimping tool 10 is configured to store data related to the crimping operation or crimp connection data, which can include connector size, connector material, crimping tool ID, crimp date/time, crimp dimension, crimp pressure, and/or a crimp state, as well as combinations thereof, among other data.

Regardless of the crimp state, the crimp connection data may be transmitted to a remote computing device 40 via the wireless module 38. The crimp connection data can be transmitted to the remote computing device 40 in a variety of manners and/or at a variety of different times, including, for example, upon demand. The remote computing device 40 generally includes a display and an input device implemented therein and has wireless communication capabilities that can communicate with the wireless module 38 of the crimping tool 10. Non-limiting examples of remote computing devices include mobile phones (smartphones), tablets, personal digital assistants (PDA) having wireless communication capabilities, or other similar devices. In a preferred embodiment, the wireless module 38 is a Bluetooth module capable of communicating (exchanging data) wirelessly with the remote computing device 40.

Figure 8:
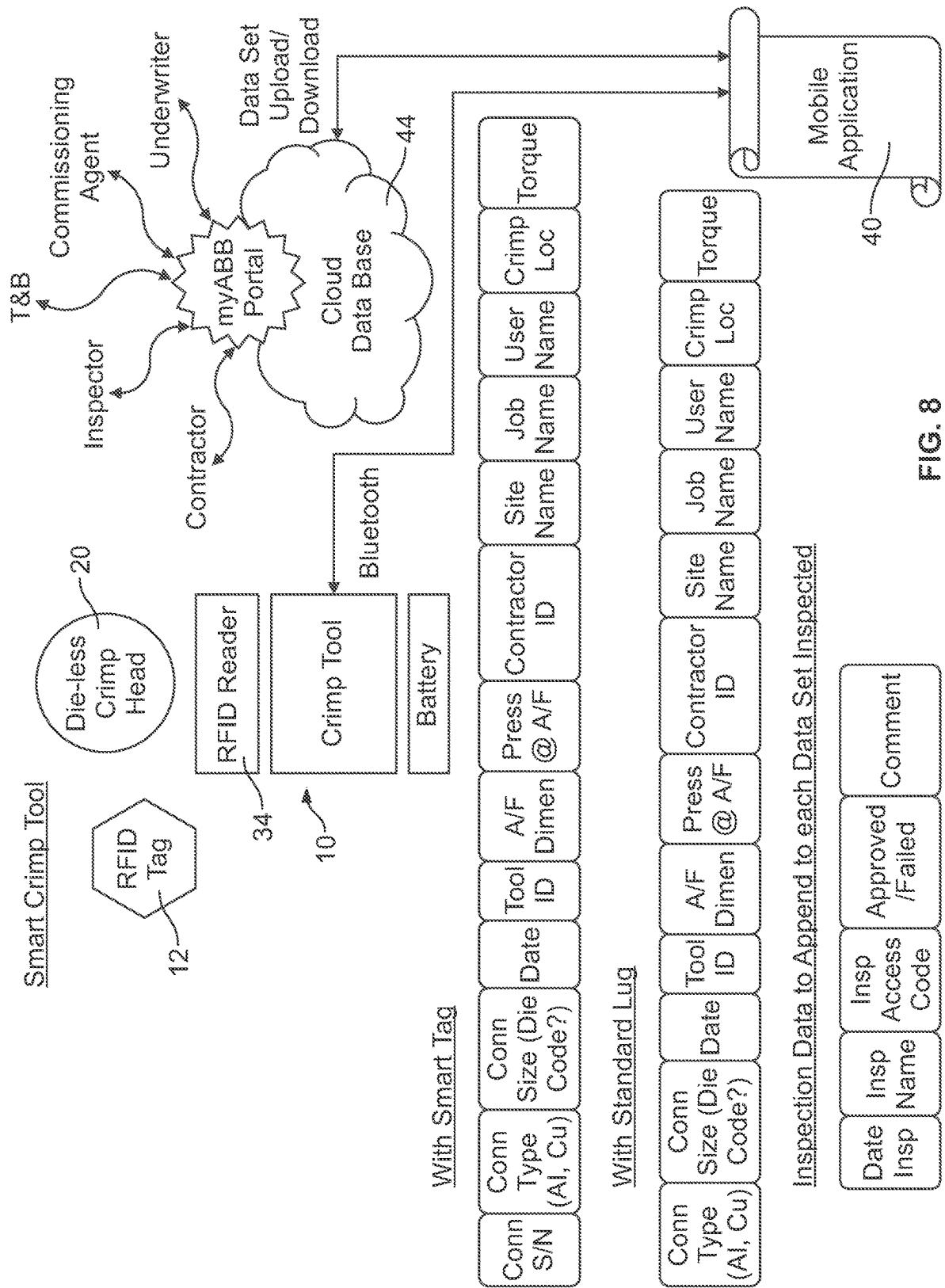
FIG. 8 is another system design diagram illustrating wireless communications and data generation between the crimping tool in FIG. 1 and other devices.

Referring to FIGS. 6-8, once the crimp connection data is transmitted to the remote computing device 40, the user 16 can add additional information such as, for example, contractor ID, site name, job name, user name, crimp location, torque, etc., via a mobile application installed on the remote computing device 40

The remote computing device 40 is also capable of communicating with servers organized on a cloud platform 44 to wirelessly exchange (upload or download) data such as the crimp connection data and electrical connector characteristics. Specifically, according to certain embodiments, the remote computing device 40 can communicate with a database management system 46 configured within the server 44. The database management system 46 and the server 44 can be maintained in a network by a third party and/or configured as a cloud storage 44 that is designed to save, manage, and/or share crimped connection data, as shown in FIGS. 6-8. In the depicted embodiment, although only one crimping tool 10 and one remote computing device 40 are shown, a plurality of remote computing devices can communicate with a plurality of crimping tools 10 to transmit/receive electrical connector characteristics.

The database management system 46 can be of any electronic, non-transitory form that is configured to manage one or more databases, including, but not limited to, an electrical connector database 50. The electrical connector database 50 can be configured to store various data structures associated with various electrical connectors and crimp connector data.

Referring more particularly to FIG. 6, the electrical connector database 50 can contain a plurality of tables, such as, for example, electrical connector table, crimp operation table, user account table, etc., to store data that can demonstrate compliance with predetermined parameters. The electrical connector table can be configured to store data structures corresponding to the electrical connector characteristics, which can include, among other information, connector identification number, connector type, and/or connector size, as well as combinations thereof. The crimp operation table can be configured to store data structures corresponding to crimp operations, which can include, among other data, connector identification number, crimping force, crimping displacement, final crimp dimension, crimping state, and/or manually entered information, as well as combinations thereof, related to crimping operation and location by the user 16.

From the foregoing, it will be appreciated that a crimping tool according to the present application includes a wireless communication system to enable the tool to apply appropriate crimp parameters without the need for manual settings or adjustments, and provide crimp connection data that demonstrates compliance with predetermined parameters.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A crimping tool configured to crimp an electrical connector onto a conductor, the crimping tool comprising:
   a crimping body having an interior volume;
   a crimping head including movable jaws adapted to crimp a connector, the crimping head being coupled to the crimping body;
   a user interface installed on the crimping body;
   an identification tag reader attached to the crimping tool;
   a wireless module installed within the interior volume of the crimping body, the wireless module capable of transmitting/receiving crimp connection data to/from a remote computing device, the remote computing device capable of communicating with one or more databases in a server; and
   a microcontroller installed within the interior volume of the crimping body for communicating with the identification tag reader and the wireless module.

2. The crimping tool of claim 1, wherein the electrical connector includes an identification tag, which contains the electrical connector characteristics associated with the electrical connector.

3. The crimping tool of claim 2, wherein the identification tag reader is configured to read/scan the identification tag and collect the electrical connector characteristics associated with the electrical connector.

4. The crimping tool of claim 3, wherein, after reading the identification tag, the crimping tool is configured to apply a distance of movement to the movable jaws and verify a minimum required pressure according to the electrical connector characteristics associated with the electrical connector.

5. The crimping tool of claim 4, wherein the crimping tool is configured to provide a crimp state via the user interface after crimping the electrical connector.

6. The crimping tool of claim 5, wherein the crimping state is a success or a failure based upon the minimum required pressure and distance of movement of components of the crimping head.

7. The crimping tool of claim 3, wherein the microcontroller executes computer programs to retrieve the minimum required pressure and distance of movement of the movable jaws suitable for crimping the electrical connector from a lookup table stored in a memory.

8. The crimping tool of claim 2, wherein the identification tag is a RFID tag, QR code, or barcode.

9. The crimping tool of claim 8, wherein the RFID tag is a passive RFID tag.

10. The crimping tool of claim 1, wherein the electrical connector is a conventional standard electrical connector, without an identification tag.

11. The crimping tool of claim 1, wherein the electrical connector characteristics include a connector identification number, a connector type, and a connector size.

12. The crimping tool of claim 1, wherein the remote computing device includes mobile computing devices such as smartphones or tablets.

13. The crimping tool of claim 1, wherein the user interface allows a user to manually input the electrical connector characteristics associated with the electrical connector.

14. The crimping tool of claim 1, wherein the wireless module is a Bluetooth module capable of communicating wirelessly with the remote computing device.

15. The crimping tool of claim 1, wherein the server is a network server or a cloud storage.

16. The crimping tool of claim 1, wherein the electrical connector is in the size range of 4/0 to 750 kcmil for a copper electrical connector and 1/0 to 600 kcmil for an aluminum electrical connector.

17. The crimping tool of claim 1, wherein the crimping tool produces a dieless crimp shape such as an indenter shape or a hexagonal shape.

18. The crimping tool of claim 1, wherein the crimping tool is configured to record and store the crimp connection data after a crimping operation and transmit the crimp connection data to the remote computing device via the wireless module.

19. The crimping tool of claim 18, wherein the crimp connection data may include connector identification number, connector size, connector type, crimping pressure, final crimp dimension, tool ID, crimp date/time, and crimp status indicator.

20. The crimping tool of claim 19, wherein the crimp connection data demonstrates compliance with predetermined parameters and is stored in the one or more databases in the server via the remote computing device.

21. The crimping tool of claim 1, wherein the crimping tool is dieless.

* * * * *